(No Model.)
E. W. McGUIRE.
ADJUSTABLE JOURNAL BEARING.
No. 514,331. Patented Feb. 6, 1894.
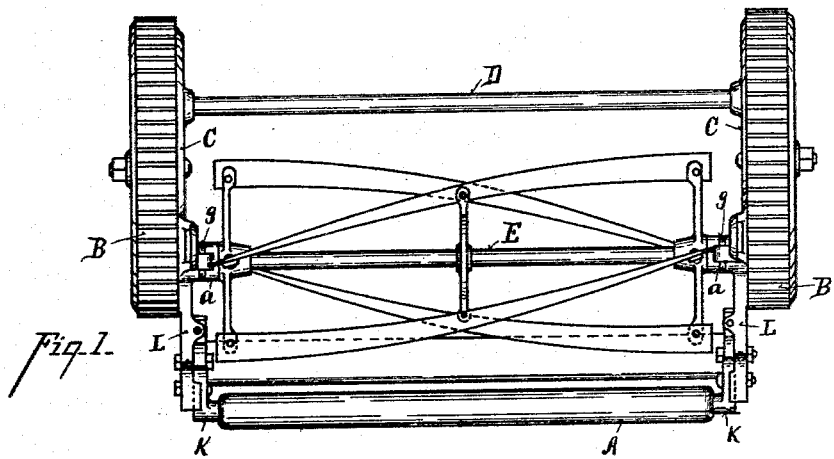
Fig. 1.
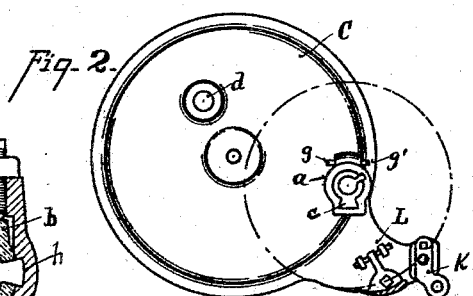
Fig. 2.
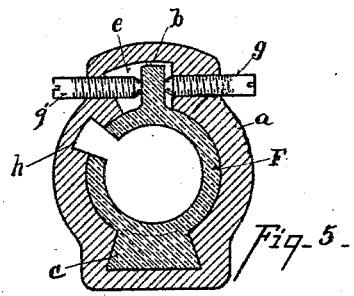
Fig. 5.
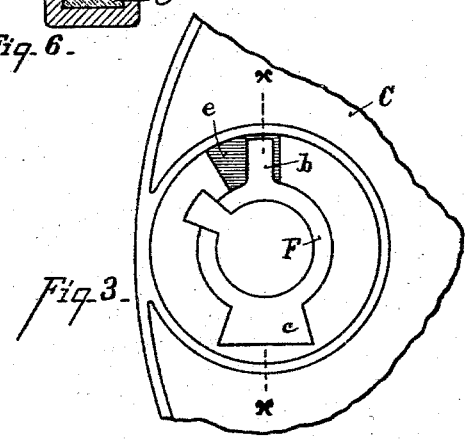
Fig. 6.
Fig. 3.
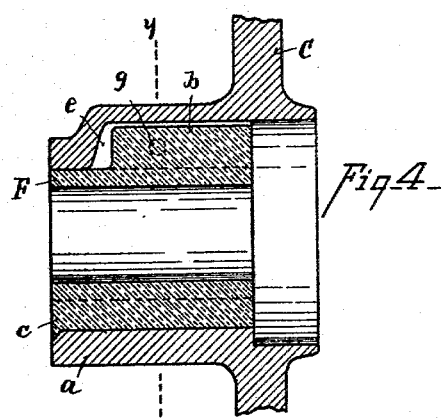
Fig. 4.
Attest
C. W. Miles
O. E. Kaiser
Inventor
Elwood W. McGuire
By Wood & Boyd
Attys

UNITED STATES PATENT OFFICE.

ELWOOD W. McGUIRE, OF RICHMOND, INDIANA.

ADJUSTABLE JOURNAL-BEARING.

SPECIFICATION forming part of Letters Patent No. 514,331, dated February 6, 1894.

Application filed September 22, 1893. Serial No. 486,231. (No model.)

*To all whom it may concern:*

Be it known that I, ELWOOD W. MCGUIRE, a citizen of the United States, residing at Richmond, in the county of Wayne and State of Indiana, have invented certain new and useful Improvements in Adjustable Journal-Bearings for Lawn-Mowers, of which the following is a specification.

The object of my invention is to provide an improved adjustable journal bearing for the knife axis.

The various features of my improvement are fully set forth in the description of the accompanying drawings making a part of this specification, in which—

Figure 1 is a plan view of a lawn mower with my improvement attached. Fig. 2 is an inside plan view of the head plate. Fig. 3 is an enlarged plan view of the journal bearing. Fig. 4 is a section on line $x, x$, Fig. 3. Fig. 5 is a section on line $y, y$, Fig. 4. Fig. 6 is a modification of Fig. 5.

A represents the roller in rear of the knife bearing. B, B, the ground driving wheels. C the head plate. D a brace rod secured to the orifices $d$ in the head plate C. E the axis of the knife blades, which is constructed in the usual manner.

My improvement relates to the journal for the axis; in the operation of lawn mowers the strain and wear are upon the forward and upward side of the journal; to take up lost motion and keep the journal bearing true by adjustment from time to time I construct the same as follows: F represents a split box inserted in the housing or hub $a$ of the head plate; it is provided with an anchoring lug $c$, and an adjusting lug $b$ which lies loosely in the recess $e$; the anchoring lug $c$ fitting closely in the recess on the opposite side of the hub $a$; $g, g'$ represent adjusting screws bearing against the lug $b$ on each side.

The journal box is adjusted to fit the axis in the following manner: Said screw $g'$ is slackened; set screw $g$ is turned down; it bears upon the lug $b$, the anchoring lug $c$ holds the split box firmly in position on one side, allowing the opposite or split side to yield contracting the circle of the boxing, and bringing it to the size of the shaft. If the boxing is unduly clamped the screw $g$ is slackened, set screw $g'$ turned up expanding the boxing. By this means lost motion is taken up and the axle is at all times properly adjusted to its bearing. I prefer to make the journal bearing F of brass, phosphor-bronze, or other metal such as is usual for journal bearings.

The axle is provided with a linch-pin, not shown, which projects from one side thereof, and to enable said axle to be easily removed without withdrawing the pin, I have provided a recess $h$, in one side of the wall of the hub $a$.

The shape and form of the anchoring device upon one side of the boxing is immaterial so long as it is firmly held to the head plate or housing at one side, and means for compression or expansion of the circle of the box are provided on the opposite side.

K represents the lug for supporting the roller. L the adjusting lug in which the stationary knife bears. These last named parts may be of the usual construction.

Having described my invention, what I claim is—

1. The combination with the head-plate C provided with a hub $a$ having a recess, of the elastic split journal-box F formed of a single piece and having an anchoring lug $c$ engaged with the said recess in the journal-box, and means for compressing the split journal-box, substantially as described.

2. In combination with the head-plate C provided with a hub, having an upper and lower recess, the split journal-bearing F provided with an anchoring lug $c$, firmly seated in said lower recess, and an adjusting lug $b$, supported in the upper recess, substantially as described.

3. In combination with the head plate C provided with a hub, having an upper recess $e$, and a lower dove-tailed recess, the split journal bearing F, provided with a dove-tailed anchoring lug $c$, firmly seated in said lower recess, and an adjusting lug $b$, movably supported in said upper recess, and set screws bearing against the opposite sides of said lug, substantially as described.

In testimony whereof I have hereunto set my hand.

ELWOOD W. McGUIRE.

Witnesses:
HENRY C. STARR,
OTTO H. SPRONG.